United States Patent
Tsotsis et al.

(10) Patent No.: US 12,330,993 B2
(45) Date of Patent: Jun. 17, 2025

(54) METHOD FOR PRODUCING HIGH-TEMPERATURE-RESISTANT COATINGS AND STRUCTURES

(71) Applicant: The Boeing Company, Chicago, IL (US)

(72) Inventors: Thomas Karl Tsotsis, Santa Ana, CA (US); Nicholas A. Kotov, Ypsilanti, MI (US)

(73) Assignee: The Boeing Company, Arlington, VA (US)

( * ) Notice: Subject to any disclaimer, the term of this patent is extended or adjusted under 35 U.S.C. 154(b) by 34 days.

(21) Appl. No.: 17/510,497

(22) Filed: Oct. 26, 2021

(65) Prior Publication Data

US 2023/0130304 A1   Apr. 27, 2023

(51) Int. Cl.
| | | |
|---|---|---|
| C04B 35/00 | (2006.01) | |
| B05D 7/00 | (2006.01) | |
| B28B 1/00 | (2006.01) | |
| B28B 11/00 | (2006.01) | |
| B28B 11/24 | (2006.01) | |
| B33Y 10/00 | (2015.01) | |

(Continued)

(52) U.S. Cl.
CPC ........ *C04B 35/62222* (2013.01); *B28B 1/001* (2013.01); *B28B 11/243* (2013.01); *B33Y 10/00* (2014.12); *B33Y 40/20* (2020.01); *C04B 35/6264* (2013.01); *C04B 35/64* (2013.01); *C04B 2235/3229* (2013.01); *C04B 2235/3232* (2013.01); *C04B 2235/3244* (2013.01); *C04B 2235/3258* (2013.01); *C04B 2235/5292* (2013.01); *C04B 2235/5296* (2013.01); *C04B 2235/656* (2013.01)

(58) Field of Classification Search
CPC ........................ C04B 35/62222; C04B 41/009
See application file for complete search history.

(56) References Cited

U.S. PATENT DOCUMENTS

| | | | |
|---|---|---|---|
| 6,187,123 B1 * | 2/2001 | Chenier | C04B 41/5059 |
| | | | 156/89.22 |
| 8,795,783 B2 | 8/2014 | Kotav | |

(Continued)

FOREIGN PATENT DOCUMENTS

| | | | | |
|---|---|---|---|---|
| CN | 108558443 | * | 9/2018 | ......... C01B 21/0646 |
| CN | 108558443 A | | 9/2018 | |
| WO | WO2003/0103854 | | 12/2003 | |

OTHER PUBLICATIONS

CN-108558443 (Zhongliu) Sep. 2018 (online machine translation), [Retrieved on Jul. 11, 2023]. Retrieved from: Espacenet (Year: 2018).*

(Continued)

*Primary Examiner* — Alison L Hindenlang
*Assistant Examiner* — Andres E. Behrens, Jr.
(74) *Attorney, Agent, or Firm* — Walters & Wasylyna LLC (57) ABSTRACT

A method for forming a ceramic-based material comprises depositing a ceramic-precursor composition comprising nanoparticles having at least one dimension less than 100 nm and an aspect ratio of 1.5 or greater, and a carrier fluid on a surface of a substrate to form an as-deposited layer of the ceramic precursor composition; and sintering the as-deposited layer of the ceramic precursor composition at a sintering temperature to form a ceramic-based material.

20 Claims, 4 Drawing Sheets

(51) Int. Cl.

| | |
|---|---|
| B33Y 40/20 | (2020.01) |
| B82Y 30/00 | (2011.01) |
| B82Y 40/00 | (2011.01) |
| C04B 35/622 | (2006.01) |
| C04B 35/626 | (2006.01) |
| C04B 35/64 | (2006.01) |

(56) References Cited

U.S. PATENT DOCUMENTS

| | | | |
|---|---|---|---|
| 10,005,668 B1* | 6/2018 | Hung | C01B 21/0648 |
| 2004/0023317 A1* | 2/2004 | Kotov | G01N 33/54373 |
| | | | 435/14 |
| 2004/0038007 A1* | 2/2004 | Kotov | B01D 69/141 |
| | | | 428/174 |
| 2010/0098902 A1* | 4/2010 | Kotov | B05D 7/54 |
| | | | 428/105 |
| 2012/0156389 A1* | 6/2012 | Kotov | B82Y 40/00 |
| | | | 427/415 |

OTHER PUBLICATIONS

Wikipedia's Article on Boron Nitride (Boron Nitride, 2019) https://web.archive.org/web/20190815080230/https://en.wikipedia.org/wiki/Boron_nitride (Year: 2018).*

3M (Cool & In Control, 2016, hereinafter 3M) https://web.archive.org/web/20160804211525/http://multimedia.3m.com:80/mws/media/10457560/3m-boron-nitride-cooling-fillers-brochure.pdf (Year: 2016).*

Https://web.archive.org/web/20160814023729/https://www.americanelements.com/boron-nitride-nanoparticles-10043-11-5 (Year: 2016).*

Https://web.archive.org/web/20210730143127/https://www.sigmaaldrich.com/US/en/technical-documents/technical-article/materials-science-and-engineering/photovoltaics-and-solar-cells/titania-nanotubes-synthesis-and-applications (Year: 2021).*

Https://web.archive.org/web/20170707074016/https://www.hqgraphene.com/h-BN.php (Year: 2017).*

German, Randall M. "Titanium Sintering Science: A Review of Atomic Events During Densification." International Journal of Refractory Metals & Hard Materials, vol. 89, Elsevier BV, Jun. 2020, p. 105214. https://doi.org/10.1016/j.ijrmhm.2020.105214. (Year: 2020).*

A.) Crovetto et al. (Nondestructive Thickness Mapping of Wafer-Scale hBN Down to a Monolayer, 2018, https://pubmed.ncbi.nlm.nih.gov/29979573/#:~:text=With%20some%20assumptions%20on%20the,2.5%20%C3%85%20%C2%B1%200.1%20%C3%85 (Year: 2018).*

Chao, Sheng, et al. "Effects of Sintering Temperature on the Microstructure and Dielectric Properties of Titanium Dioxide Ceramics." Journal of Materials Science, vol. 45, No. 24, Springer Science+Business Media, Jul. 2010, pp. 6685-6693. https://doi.org/10.1007/s10853-010-4761-4. (Year: 2010).*

Fang, Zhigang Zak, et al. "Coarsening, Densification, and Grain Growth During Sintering of Nano-sized powders—A Perspective." International Journal of Refractory Metals & Hard Materials, vol. 62, Elsevier BV, Jan. 2017, pp. 110-117. https://doi.org/10.1016/j.ijrmhm.2016.09.004. (Year: 2017).*

Fang, Z-q., and Haiyan Wang. "Sintering of Ultrafine and Nanosized Ceramic and Metallic Particles." Ceramic Nanocomposites, 2013, https://doi.org/10.1533/9780857093493.3.431. (Year: 2013).*

Https://www.collinsdictionary.com/us/dictionary/english/carbonize (Year: 2018).*

Zapata-Solvas, Eugenio, et al. "Preliminary Investigation of Flash Sintering of SiC." Journal of the European Ceramic Society, vol. 33, No. 13-14, Nov. 2013, pp. 2811-2816. https://doi.org/10.1016/j.jeurceramsoc.2013.04.023. (Year: 2013).*

Krenkel, Walter, and Florian Reichert. "5.1 Design Objectives and Design Philosophies, Interphases and Interfaces in Fiber-Reinforced CMCs." Elsevier eBooks, 2018, pp. 1-18. https://doi.org/10.1016/b978-0-12-803581-8.09986-0. (Year: 2018).*

Wikipedia contributors. "Reinforced Carbon-carbon." Wikipedia, Feb. 2, 2024, en.wikipedia.org/wiki/Reinforced_carbon (Year: 2020).*

Powder Solutions. www.bn.saint-gobain.com/products/powder-solutions. (Year: 2018).*

Https://en.wikipedia.org/wiki/Lay-up_process (Year: 2020).*

Buffat et al., "Size effect on the melting temperature of gold particles*" *Physical Review A*, vol. 13, No. 6, Jun. 1976, pp. 2287-2298.

Mamedov et al., "Molecular design of strong single-wall carbon nanotube/polyelectrolyte multilayer composites," *Nature materials*, vol. 1, Nov. 2002k, pp. 190-195.

Tang et al, "Nanostructured Artificial Nacre," *Nature Materials*, vol. 2, Jun. 2003.

Extended European Search Report issued on European Application EP 221928419.9, mailed Mar. 22, 2023, pp. 1-6.

Innovation, Science and Economic Development Canada.Marks & Clerk. Requisition by the Examiner and Examination Search Report. Feb. 27, 2024.

* cited by examiner

METHOD FOR PRODUCING HIGH-TEMPERATURE-RESISTANT COATINGS AND STRUCTURES

BACKGROUND

Ceramics materials are widely used in transportation, including aerospace, due to their high-temperature resistance and mechanical strength, resistance to corrosion in both oxidative and reductive environments, light weight, and low thermal-expansion coefficients. Components of airplanes and space vehicles requiring these properties include engine parts, brakes, insulating tiles, leading edges and cones, and even elements of cabin interiors. Ceramic-matrix composites combining ceramics with other materials such as carbon fibers are also important as they combine resistance to temperatures as high 2910° F. (1600° C.) and fracture toughness, a combination that is very difficult to achieve for single-component ceramics. Metal carbides are particularly important due to their light weight and multifunctional properties.

Processing of ceramic composites into coatings or other aviation components is, however, challenging. The initial stages generally involve chemical vapor deposition (CVD), precursor pyrolysis, reactive melt infiltration, slurry infiltration, and hot pressing. Annealing requires high-temperature processing of the precursors at temperatures as high as 5430° F. (3000° C.) to sinter the constituent particles and fibers. Both bulk parts and coatings tend to deform during this process and components may also undergo undesirable phase changes.

SUMMARY

Provided are methods for forming ceramic-based materials, including coatings, three-dimensional (3D) objects, and ceramic composites thereof, having desirable properties such as high-temperature resistance and increased toughness. Compared to existing methods, however, the present methods employ significantly lower temperatures. This avoids problems such as warping and delamination as well as enables the use of a greater variety of substrates in making the ceramic-based materials.

In an embodiment 1, a method for forming a ceramic-based material comprises depositing a ceramic-precursor composition comprising nanoparticles having at least one dimension less than 100 nm and an aspect ratio of 1.5 or greater, and a carrier fluid on a surface of a substrate to form an as-deposited layer of the ceramic precursor composition; and sintering the as-deposited layer of the ceramic precursor composition at a sintering temperature to form a ceramic-based material.

An embodiment 2 is the method according to embodiment 1, wherein the nanoparticles have at least one dimension in a range of from 1 nm to 100 nm.

An embodiment 3 is the method according to embodiment 2, wherein the nanoparticles have each of their dimensions less than 100 nm.

An embodiment 4 is the method according any of embodiments 1-3, wherein the nanoparticles are nanoplatelets.

An embodiment 5 is the method according to any of embodiments 1-4, wherein the nanoparticles comprise a ceramic compound.

An embodiment 6 is the method according to any of embodiments 1-5, wherein the nanoparticles comprise $WO_3$, ceria, hafnia, titania, or combinations thereof.

An embodiment 7 is the method according to any of embodiments 1-6, wherein the nanoparticles comprise a compound that forms a ceramic compound during sintering.

An embodiment 8, is the method according to any of embodiments 1-7, wherein the nanoparticles are monocrystalline.

An embodiment 9 is the method according to any of embodiments 1-8, wherein the carrier fluid is water, an organic solvent, or an ionic liquid.

An embodiment 10 is the method according to any of embodiments 1-8, wherein the carrier fluid is an inorganic ionic liquid.

An embodiment 11 is the method according to any of embodiments 1-8, wherein the carrier fluid is a polymer or a precursor thereof.

An embodiment 12 is the method according to embodiment 11, wherein the polymer an inorganic polymer or precursor thereof.

An embodiment 13, is the method according to any of embodiments 1-12, wherein the deposition is carried out at a temperature of less than 100° C.

An embodiment 14 is the method according to embodiment 13, wherein the deposition is carried out at room temperature or below.

An embodiment 15 is the method according to any of embodiments 1-14, wherein the deposition is carried out using layer-by-layer deposition to provide an as-deposited multilayer structure comprising the as-deposited layer of the ceramic precursor composition.

An embodiment 16 is the method according to any of embodiments 1-15, wherein the sintering temperature is below a sintering temperature that would be used if particles of the same composition as the nanoparticles were used, but having a diameter of from about 5 μm to about 100 μm.

An embodiment 17 is the method according to any of embodiments 1-16, wherein the sintering temperature is 1000° C. or less.

An embodiment 18 is the method according to any of embodiments 1-17, wherein the substrate is a porous, carbonized substrate.

In an embodiment 19, a method for forming a ceramic-based material comprises depositing a ceramic precursor composition comprising ceramic nanoparticles having at least one dimension less than 100 nm and an aspect ratio of 1.5 or greater and a carrier fluid on a surface of a substrate via layer-by-layer deposition to form an as-deposited layer of the ceramic precursor composition; and sintering the as-deposited multilayer structure at a sintering temperature to form a ceramic-based material.

An embodiment 20 is the method according to embodiment 19, further comprising depositing a composition comprising a non-ceramic material via layer-by-layer deposition to form a layer of the non-ceramic material in the as-deposited multilayer structure.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided are methods for forming ceramic-based materials, including coatings and three-dimensional (3D) objects.

The present methods comprise depositing a ceramic precursor composition comprising nanoparticles and a carrier fluid on a surface of a substrate to form an as-deposited layer of the ceramic precursor composition on the surface. Depositions may be carried out one time, to form a single layer, but are generally carried out multiple times, to form a multilayer structure. In embodiments, each layer possesses an opposite charge from that of an underlying previously deposited layer (after rinsing any excess material that may remain from the underlying previously deposited layer) that are bonded by covalent and noncovalent forces. Prior to the deposition of an initial layer of the ceramic precursor composition, the substrate may be prepared by treating areas of the substrate to be coated to have a charge opposite from that of the initial layer. If the same ceramic precursor composition is used during multiple depositions, the chemical composition of the individual layers of the multilayer structure are the same. If different ceramic precursor compositions are used having different chemical compositions, the chemical composition of the individual layers will be different. Other types of compositions (e.g., those comprising other materials, including non-ceramic materials) may be deposited to include other materials within the multilayer structure. This is useful to provide ceramic composites. As further described below, although various deposition techniques may be used, the temperature used during the deposition is relatively low, e.g., room temperature. Next, the as-deposited (multi)layer is sintered to form a ceramic-based material. As further described below, the temperature used during sintering is lower than that typically used to sinter ceramics. This includes using a sintering temperature of, e.g., less than 1000° C.

Figure 1:
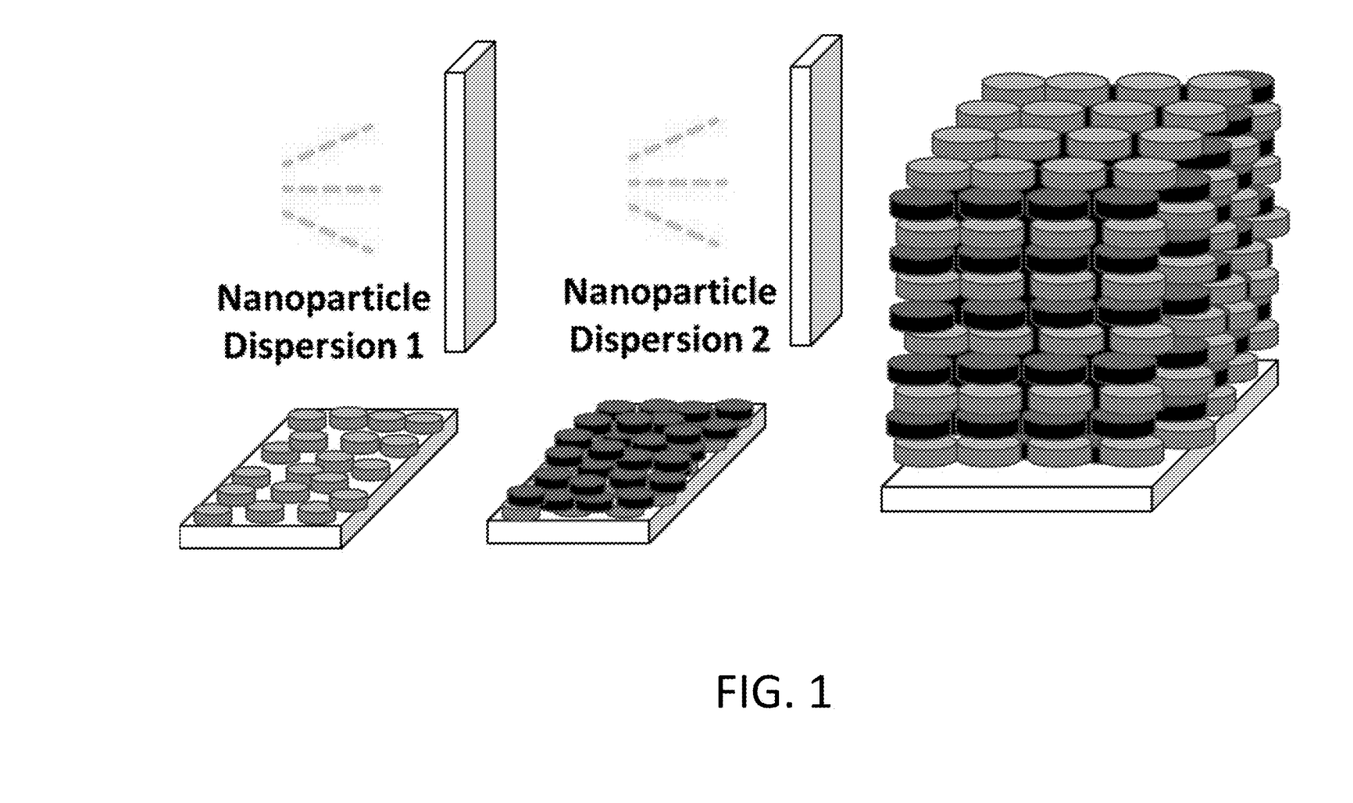
FIG. 1 is a schematic showing the layer-by-layer deposition of ceramic precursor compositions 1 and 2, each comprising ceramic nanoplatelets dispersed in a carrier fluid according to an illustrative embodiment of the present methods. The resulting multilayer structure is also shown.

The nanoparticles to be used in the present methods may be characterized by their morphology and dimensions. However, the nanoparticles are generally non-spherical having an aspect ratio of 1.5 or higher. This includes an aspect ratio of 1.7, 2, 5, 10, 50, 100, etc. At least one dimension of the nanoparticles is nanoscale, i.e., 100 nm or less. This includes nanoparticles having one dimension, two dimensions, or all three dimensions that are nanoscale. The nanoscale dimension(s) may be 90 nm or less, 70 nm or less, 50 nm or less, 25 nm or less. This includes embodiments in which the nanoscale dimension(s) is in a range of from 1 nm to 20 nm, from 1 nm to 15 nm, from 1 nm to 10 nm, from 1 nm to 5 nm, and from 2 nm to 5 nm. Any non-nanoscale dimensions (if any) are greater than 100 nm. Shapes of the non-spherical nanoparticles include, e.g., nanorods, nanotubes, nanofibers, nanowhiskers, nanodiscs, nanoplates, nanoplatelets, nanoflakes, etc. FIG. 1 shows the shape of illustrative nanoplatelets. However, nanoplatelets need not have perfectly circular cross-sections, nor do they need to be perfectly identical as depicted in the schematic. Each of the three dimensions of such nanoplatelets may be nanoscale, but as noted above, the aspect ratio of the nanoplatelets is greater than 1, 1, 1.5 (x, y, z directions, respectively), e.g., 1.5 or higher with the surface-area-to-volume ratio being relatively large. In embodiments, the nanoparticles are nanoplatelets having at least one dimension (the z-direction) in a range of from 1 to 100 nm. This includes having the at least one dimension (the z-direction) be in a range of from 1 to 50 nm, from 1 to 25 nm, from 1 to 5 nm, or from 2 to 5 nm. In embodiments, the nanoparticles are nanoplatelets having at least two, or all three dimensions within any of these ranges. The use of nanoparticles having nanoscale dimension(s), such as nanoplatelets, is by contrast to the typical size of ceramic particles (e.g., from 5 μm to 100 μm) used to form high-temperature ceramics using existing methods. The nanoparticle aspect ratio and dimensions may refer to average values, i.e., averaged over a representative number of nanoparticles.

The composition of the nanoparticles is generally a ceramic compound. Ceramic compounds refer to inorganic (although elements in the ceramic compound can include carbon), nonmetallic (although elements in the ceramic compound can include metals), and crystalline (i.e., as opposed to amorphous) solids. Illustrative ceramic compounds include oxides such as alumina, beryllia, ceria, zirconia, and hafnia. Ceramic compounds also include non-oxides such as borides, carbides, carbonates, nitrides, phosphates, silicides, and phosphates. The oxides and non-oxides include those of metals and metalloids, e.g., calcium, titanium, hafnium, and silicon, without limitation. Specific illustrative ceramic compounds include boron oxide, boron nitride, silicon aluminum oxynitride, silicon carbide, silicon nitride, tantalum carbide, hafnium carbide, titanium carbide, tungsten oxide, and tungsten carbide. In embodiments, the nanoparticles are composed of $WO_3$, ceria, hafnia, or titania.

In embodiments, instead of the nanoparticles being composed of a ceramic compound, the nanoparticles are composed of a material that is capable of forming a ceramic compound during the steps of the method, e.g., during sintering. This includes the nanoparticles forming the ceramic compound with the substrate during the steps of the method. The ceramic compound which may be formed includes any of those described above.

A single type of nanoparticle (e.g., having a single type of chemical composition) may be used, or a combination of different types (e.g., having more than one type of chemical composition). In embodiments, a single type of nanoparticle is used.

The nanoparticles may also be characterized by their crystallinity. In embodiments, the nanoparticles are monocrystalline, by which it is meant they are composed of a single crystalline phase (i.e., as opposed to polycrystalline).

Nanoparticles may be unfunctionalized, functionalized (e.g., to facilitate their dispersal in the carrier fluid), or carrying spontaneously formed (i.e. self-assembly via surface adsorption onto the substrate) layers, to provide a desired component for a ceramic composite to be formed using the present methods, or both. For example, during sintering, organic ligands of organic-functionalized nanoparticles may be carbonized, thereby providing carbon as a component of a ceramic composite. Functionalization may also be used to achieve nanoparticles having a desired overall charge, which is useful for layer-by-layer deposition as described below.

The carrier fluid provides a vehicle for dispersing and carrying the nanoparticles. The carrier fluid desirably allows for the formation of a stable dispersion of the nanoparticles, i.e., a colloid. The carrier fluid may also be used to impart a desired overall charge to the as-deposited layer to facilitate layer-by-layer deposition as described below. Thus, selection of an appropriate carrier fluid can depend upon the desired nanoparticles and the deposition technique used. A single type (e.g., single chemical composition) of carrier fluid or a combination of different types (e.g., different chemical compositions) of carrier fluids may be used.

Illustrative carrier fluids include water, an organic solvent, an ionic liquid, and a polymer or a precursor thereof. Short-chain alcohols such as ethanol, methanol, isopropyl alcohol may be used. Regarding ionic liquids, this includes materials comprising one or more cations and one or more anions and which have a melting point at or below room temperature. Illustrative anions for the ionic liquid include trifluoromethylsulfonate ("triflate," $CF_3SO_3^-$), bis(trifluoromethylsulfonyl)imide ($N(CF_3SO_2)_2^-$), bis(perfluoroethylsulfonyl)imide (($C_2F_5SO_2)_2N^-$)), tris(trifluoromethylsulfonyl)methide (($CF_3SO_2)_3C^-$)), tetrafluoroborate ($BF_4^-$), hexafluorophosphate ($PF_6^-$), hexafluoroantimonate ($SbF_6^-$), and hexafluoroarsenate ($AsF_6^-$). Mixtures and combinations of different anions may be used.

Other suitable commercially available ionic liquids include: Basionic® ionic liquid products available from BASF (Florham Park, N.J.) and include: 1-Ethyl-3-methylimidazolium chloride, 1-Ethyl-3-methylimidazolium methanesulfonate, 1-Butyl-3-methylimidazolium chloride, 1-Butyl-3-methylimidazolium methanesulfonate, Methyl-tri-n-butylammonium methylsulfate, 1,2,4-Trimethylpyrazolium methylsulfate, 1-Ethyl-2,3-di-methylimidazolium ethylsulfate, 1,2,3-Trimethyl-imidazolium methylsulfate, Methylimidazolium chloride, Methylimidazolium hydrogensulfate, 1-Ethyl-3-methylimidazolium hydrogensulfate, 1-Ethyl-3-methylimidazolium tetrachloroaluminate, 1-Butyl-3-methylimidazolium hydrogensulfate, 1-Butyl-3-methylimidazolium tetrachloroaluminate, 1-Ethyl-3-methylimidazolium acetate, 1-Butyl-3-methylimidazolium acetate, 1-Ethyl-3-methylimidazolium ethylsulfate, 1-Butyl-3-methylimidazolium methylsulfate, 1-Ethyl-3-methylimidazolium thiocyanate, 1-Butyl-3-methylimidazolium thiocyanate, Choline acetate, Choline salicylate, Tris-(2-hydroxyethyl)-methylammonium methylsulfate. Mixtures and combinations of different ionic liquids may be used.

Illustrative cations for the ionic liquid include tetraalkylammonium cations. Quaternary ammonium cations may be substituted with H, F, phenyl, alkyl groups with 1 to 15 carbon atoms, and other chemical substituents. Cations may further have bridged ring structures. Mixtures and combinations of different cations may be used.

Other illustrative cations for the ionic liquid include: imidazolium; pyridinium; pyridazinium; pyrimidinium; pyrazinium; pyrazolium; oxazolium; 1,2,3-triazolium; 1,2,4-triazolium; thiazolium; piperidinium; pyrrolidinium; quinolinium; and isoquinolinium.

Although organic cations/anions may be used, in embodiments, the ionic liquid contains only inorganic ions to provide an inorganic ionic liquid. Inorganic ionic liquids include those composed of metal halides, such as mixed metal halides, and thiocyanate salts. Inorganic ionic liquids are useful to enhance the thermal and oxidative resistance of the ceramic-based materials formed using the present methods.

In embodiments, a polymer or a precursor thereof is used as the carrier fluid. By "precursor," it is meant a compound which is capable of forming the polymer during the steps of the method, e.g., during sintering. Although organic polymers/precursors may be used, in embodiments, the polymer/precursor is an inorganic polymer (i.e., does not comprise carbon atoms in its polymeric backbone). Again, inorganic polymers are useful to enhance thermal and oxidative resistance. Polysiloxanes, polysilazanes, polyphosphazenes, polyborazylenes, polyaminoboranes, are illustrative inorganic polymers. For purposes of the present disclosure, inorganic polymers such as those described above but which also comprise organic substituents may be used and may be referred to as inorganic polymers.

Additives may be included in the ceramic precursor composition as desired to tune the properties thereof as well as the properties of the desired ceramic-based material. Additives which stabilize the dispersion of the nanoparticles in the ceramic precursor composition may be used. Additives which facilitate chemical transformations (described below) during sintering may also be included. Illustrative additives include, e.g., organic substances, metal salts, boric acid, and ammonia salts.

Various loadings of the nanoparticles and if present, additives, may be included in the carrier fluid to form the ceramic precursor composition. Loading amounts may be readily determined based on the types of nanoparticles and carrier fluid being used.

Figure 2:
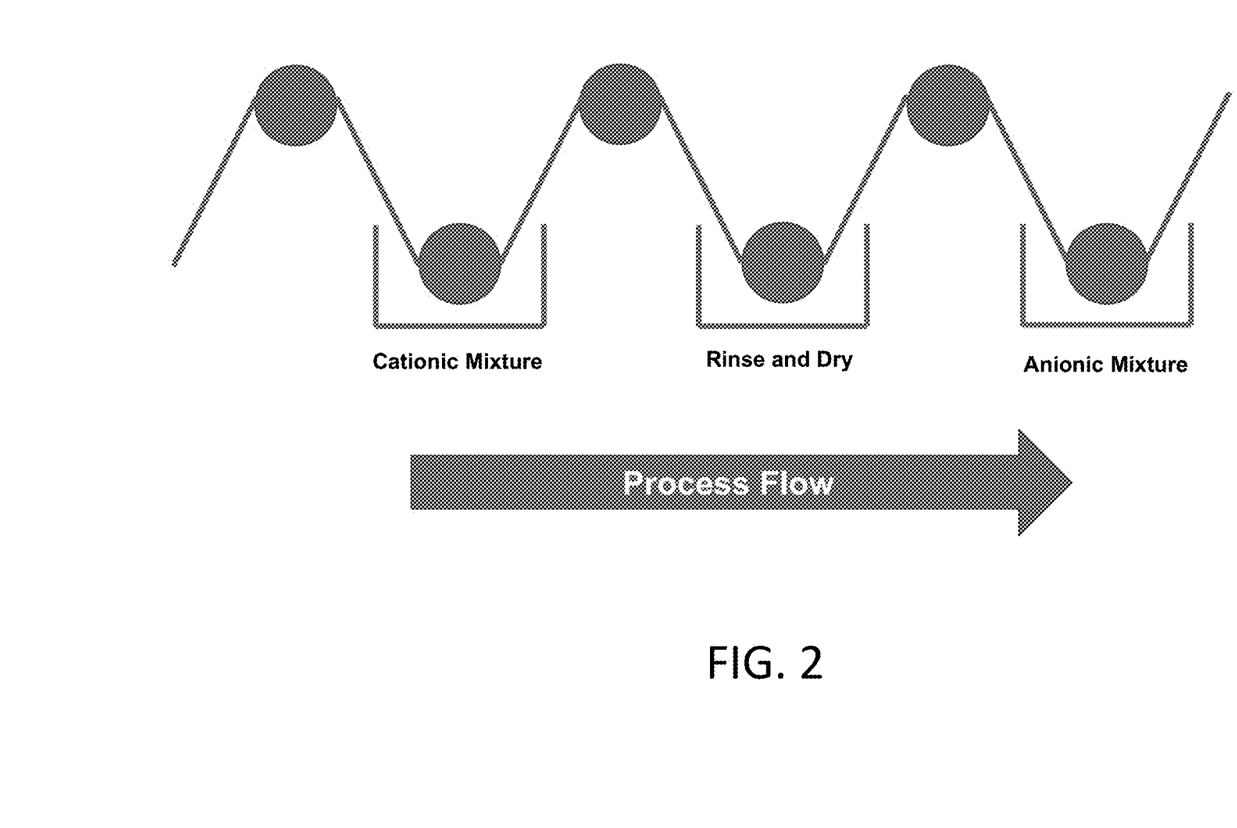
FIG. 2 is a schematic showing the use of roll-to-roll coating as an application technique to carry out layer-by-layer deposition of cationic and anionic ceramic precursor compositions according to an illustrative embodiment of the present methods.

A variety of thin-film deposition techniques may be used to form the as-deposited (multi)layer. However, the deposition technique is one that may be carried out using relatively low temperatures, including room temperature (20° C. to 25° C.). Furthermore, depending on the thermal characteristics of the carrier fluid, a range of deposition temperatures, e.g., 10° C. to 100° C. may be use. Thus, the temperature at which the deposition is carried out may be less than 100° C. One illustrative includes layer-by-layer deposition. Layer-by-layer deposition generally involves the sequential application of compositions to a surface of a substrate to build-up a multilayer structure. Application can involve spraying (see FIG. 1), dip-coating, spin-coating, roll-to-roll coating (see FIG. 2), immersion, etc. As illustrated in FIG. 1, application results in the self-assembly of the nanoparticles into relatively tightly packed monolayers of the nanoparticles, which is facilitated by their relatively high aspect ratios. Individual layers may be adhered together within the multilayer structure via electrostatic interactions (e.g., two ceramic-precursor compositions having opposite charges due to charged nanoparticles, charged carrier fluid, or combinations thereof). However, other noncovalent and covalent interactions may be used to adhere neighboring layers. Rinsing is used between application of individual layers. Drying/heating may be used between application of individual layers as desired. Prior to deposition of an initial layer, the substrate surface may be chemically and/or mechanically treated to create a charged surface. Following deposition of individual layers and prior to deposition of further layers, excess carrier fluid may be removed and recycled via heating or by other means prior to deposition of subsequent layers. Any desired number of applications and sequences may be used to achieve a variety of multilayer structures having various compositions, properties, and overall thicknesses (e.g., nanometers to microns, microns to millimeters). Although layer-by-layer deposition is often used with at least two compositions having different chemical compositions, this is not required. For example, two ceramic-precursor compositions may be used which have the same type of nanoparticles (e.g., same chemical composition), but have different charges thereon. As noted above, other types of compositions (e.g., those comprising other materials, including non-ceramic materials) may be deposited using layer-by-layer deposition to include other materials within the multilayer structure. This is useful to provide ceramic composites.

It is noted that layer-by-layer deposition allows for very high loadings of nanoparticles, far higher than achievable through existing techniques. In addition, such loadings can be tailored for each individual layer and therefore, each layer may have the same or different loadings of nanoparticles. In addition, each layer or the combination of layers may include loadings tailored to the desired level of performance for any of the properties described herein.

Another low-temperature deposition technique that may be used is freeze-casting. In this embodiment, after application of the ceramic-precursor composition to the surface of the substrate (such application could be carried out using layer-by-layer deposition as described above), a directional temperature gradient is applied to induce freezing of the carrier fluid (e.g., water) and alignment of the nanoparticles. The frozen carrier fluid may be removed (e.g., sublimation) to form a porous (multi)layer of aligned nanoparticles.

The ceramic-precursor compositions may be deposited on various substrates as desired. Substrates having planar (i.e., flat) and non-planar (e.g., curved, 3D morphology) surfaces may be used. Porous substrates, e.g., those formed from filamentary or woven/non-woven fabric carbon or ceramic fibers (e.g., aramid nanofibers), may be used. Such porous substrates may be pyrolyzed to form undoped or doped carbon foams prior to deposition of the ceramic-precursor composition. Selection of the substrate material may be guided by the desire for the substrate to form a ceramic compound with the nanoparticles; to provide a component for a ceramic composite (e.g., carbon); and/or to achieve a desired chemical and/or physical transformation during sintering (further described below). Other illustrative substrate materials include silica, carbon, metals, ceramics (e.g., silicon carbide).

As noted above, the present methods further comprise sintering the as-deposited (multi)layer to provide the ceramic-based material. Sintering involves heating the as-deposited (multi)layer to a sintering temperature for a period of time. The sintering temperature is sufficiently high so as to achieve densification and/or fusing of the individual nanoparticles together to form a solid matrix. This can include merging of crystal lattices of individual nanoparticles. However, due to the use of the present nanoparticles, the temperature at which sintering occurs is lower than in existing methods of forming ceramics. The specific sintering temperature depends, at least in part, on the composition of the nanoparticles. However, by way of example only, the sintering temperature for an as-deposited layer of a ceramic precursor composition comprising ceramic nanoparticles having one or more dimensions of from 2-5-nm may be at least 300° C. less than the sintering temperature required if larger ceramic particles were used, e.g., microparticles having a diameter of from 5 to 100 μm (and being otherwise sintered under the same conditions, e.g., sintering time). This includes at least 400° C. less, at least 500° C. less, at least 600° C. less, or at least 700° C. less. In embodiments, the sintering temperature is 1000° C. or less. This includes 950° C. or less, 900° C. or less, 850° C. or less, 800° C. or less, or in a range of from 100° C. to 1000° C. These temperatures may refer to sintering in the absence of an additional external force, e.g., pressure. This does not preclude the application of pressure during sintering, in which case the sintering temperature may be further lowered. The sintering may be induced by light, e.g., photo-induced sintering by laser or another focused light source, in which case the sintering temperature refers to the heating induced by the light. The temperatures above may refer to sintering for a particular time range, e.g., from seconds to hours. Sintering may be carried out in situ after the deposition.

Figure 3:
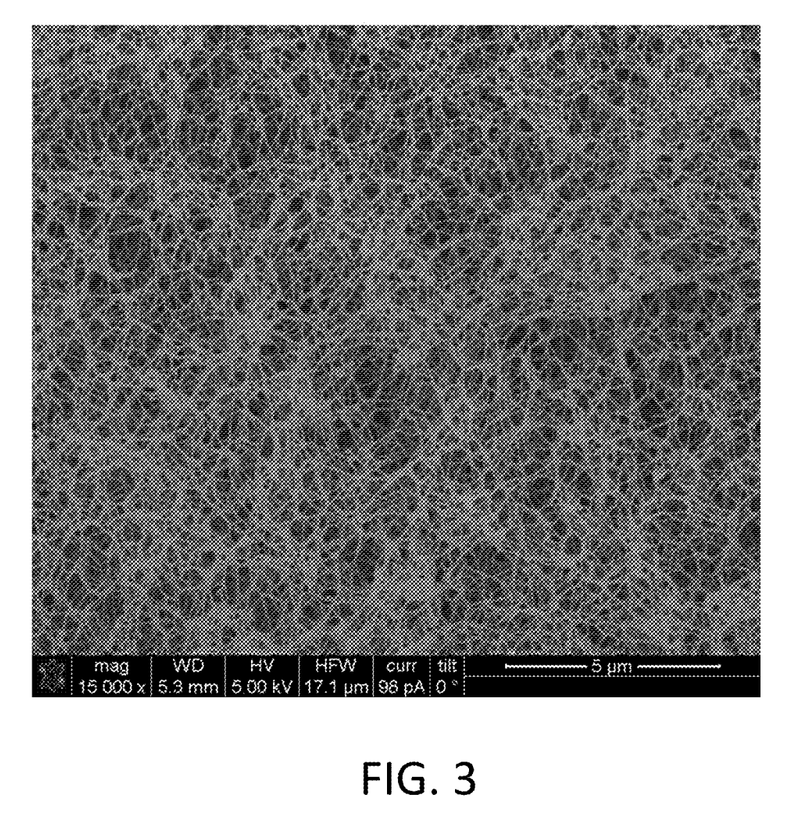
FIG. 3 is a scanning electron microscope (SEM) image of an aramid nanofiber scaffold, which may be used a porous substrate in embodiments of the present methods. Such a porous substrate may be pyrolyzed to form an N-doped carbon foam prior to deposition of a ceramic precursor composition.
Figure 4:
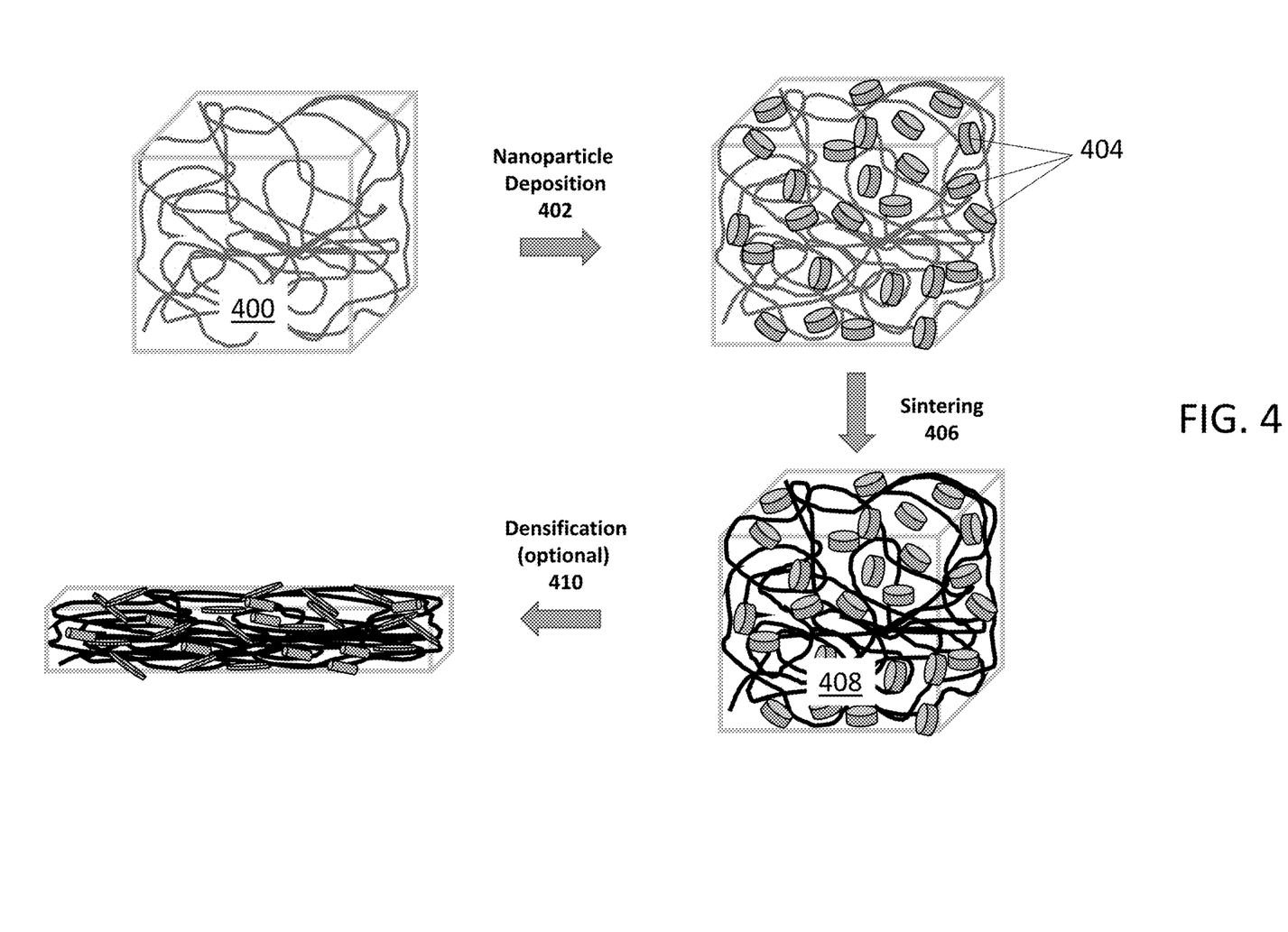
FIG. 4 is a schematic showing the conversion of an N-doped carbon foam such as that formed from the aramid nanofiber scaffold of FIG. 3 to a ceramic-based material according to an illustrative embodiment of the present methods.

FIG. 3 is an SEM image of an aramid nanofiber scaffold, which may be used as an illustrative porous substrate. As noted above, such a porous substrate may be pyrolyzed to form an N-doped carbon foam. FIG. 4 is a schematic showing the conversion of such an N-doped carbon foam 400 to a ceramic-based material 408 according to an illustrative embodiment of the present methods. As shown in step 402, any of the disclosed ceramic precursor compositions, e.g., comprising nanoplatelets 404, may be deposited onto surfaces of the N-doped carbon foam 400, followed by in situ sintering via step 406 to form the ceramic-based material 408. Densification, e.g., via hot-pressing, may be used as shown in step 410.

Other chemical and physical transformations (besides nanoparticle densification and/or fusing) may occur during sintering. Transformations involving individual nanoparticles, the substrate, and/or between nanoparticles and the substrate include decomposition and/or carbonization of ligands on functionalized nanoparticles; hydrogen bonding; non-classical crystallization; seeded growth of mesophase; seeded crystallization of the substrate; ion-exchange; recrystallization of the nanoparticles; self-assembly of the nanoparticles into other forms such as chains/sheets/capsules; ionic, covalent, or coordination bonding with the substrate; and densification of nanoparticles with the substrate. Chemical and physical transformations which may occur involving the carrier fluid include evaporation, polymerization, decomposition/carbonization, covalent bonding to nanoparticles, and crystallization of the ceramic phase therefrom.

The composition, morphology, and dimensions of the ceramic-based materials formed using the present methods depend upon the details described above. However, generally the ceramic-based materials are either in the form of a coating adhered to the substrate or a 3D object. If the coating or 3D object is composed exclusively or primarily of a ceramic compound, it may be referred to as a ceramic coating/3D object. If the coating or 3D object contains a non-ceramic material (e.g., non-carbide carbon), it may be referred to as a ceramic composite coating/3D object. The distinction between coating and 3D object is not meant to be particularly limiting. However, generally, although coatings may be thick (e.g., mm), the other two dimensions are significantly greater than the thickness. By contrast, 3D objects may be small, but are generally microscale or larger and have the three dimensions of more similar magnitude to one another.

The ceramic-based materials formed using the present methods may be characterized by a variety of properties. These include tensile strength (a). Tensile tests for coatings may be carried out using indentation tests using a standard Hysitron nanoindentor. Load-deformation curves may be obtained using a Berkovich tip. Stress-strain curves for ceramic composites may be carried out on ~1 mm-wide and 4-6 mm-long rectangular strips. Properties also include Young's modulus (E), which may be quantified using compression tests and evaluation of E in the deformation-plateau region. Other properties include electrical conductivity, adhesion, and density, measurements of which may be carried out according to ASTM standards used in the aviation industry. The specific values of each of these properties depends upon the type of ceramic-based material being used. Advantageously, the values may be tailored to the selected substrate to facilitate adhesion thereto over a wide temperature range and to meet intended usage requirements.

The present methods may be used to provide ceramic-based materials for use in a variety of environments, including the aerospace industry, the automobile industry, the submarine industry, the electronics industry, the construction industry, and the like. Thus, the phrases "aerospace industry," "automobile industry," and "submarine industry" may refer to any device, craft, machine, or components thereof used in the industries such as aircraft, an airplane, a rotocraft, a boat, a submarine, a space ship, a trajectory device, a drone, a satellite, an automobile, a bus, a locomotive, a train car, and the like.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for forming a ceramic-based material, the method comprising:
   (a) depositing a composition comprising nanoparticles having at least one dimension less than 100 nm and an aspect ratio of 1.5 or greater, and a carrier fluid on a surface of a substrate to form an as-deposited layer of the composition, wherein the nanoparticles are selected from a group consisting of $WO_3$, ceria, hafnia, titania, and combinations thereof, and further wherein the carrier fluid is an inorganic ionic liquid consisting of inorganic ions and having a melting point at or below room temperature; and
   (b) sintering the as-deposited layer at a sintering temperature to form a ceramic-based material.

2. The method of claim 1, wherein the inorganic ionic liquid is selected from metal halides, thiocyanate salts, and combinations thereof.
3. The method of claim 1, wherein the deposition is carried out using layer-by-layer deposition to provide an as-deposited multilayer structure consisting of the composition.
4. The method of claim 1, wherein the nanoparticles are monocrystalline.
5. The method of claim 1, wherein the nanoparticles have at least one dimension in a range of from 1 nm to 100 nm.
6. The method of claim 1, wherein the nanoparticles have each of their dimensions less than 100 nm.
7. The method of claim 1, wherein the nanoparticles are nanoplatelets.
8. The method of claim 1, wherein step (a) is carried out at a temperature of less than 100° C.
9. The method of claim 1, wherein step (a) is carried out at room temperature or below.
10. The method of claim 1, wherein the sintering temperature is 1000° C. or less.
11. The method of claim 1, wherein the nanoparticles comprise $WO_3$.
12. The method of claim 1, wherein the nanoparticles comprise ceria.
13. The method of claim 1, wherein the nanoparticles comprise hafnia.
14. The method of claim 1, wherein the nanoparticles comprise titania.
15. A method for forming a ceramic-based material, the method comprising:
    (a) depositing a composition comprising nanoparticles having at least one dimension less than 100 nm and an aspect ratio of 1.5 or greater, and a carrier fluid on a surface of a substrate to form an as-deposited layer of the composition, wherein the deposition is carried out using layer-by-layer deposition to provide an as-deposited multilayer structure consisting of the composition, wherein the nanoparticles are selected from a group consisting of $WO_3$, ceria, hafnia, titania, and combinations thereof, wherein the carrier fluid is an inorganic ionic liquid consisting of inorganic ions and having a melting point at or below room temperature, and wherein the inorganic ionic liquid is selected from metal halides, thiocyanate salts, and combinations thereof; and
    (b) sintering the as-deposited layer at a sintering temperature to form a ceramic-based material.
16. The method of claim 15, wherein the nanoparticles are monocrystalline.
17. The method of claim 15, wherein the nanoparticles have at least one dimension in a range of from 1 nm to 100 nm.
18. The method of claim 15, wherein the nanoparticles have each of their dimensions less than 100 nm.
19. The method of claim 15, wherein the nanoparticles are nanoplatelets.
20. The method of claim 15, wherein step (a) is carried out at a temperature of less than 100° C.

* * * * *